US012679230B2

(12) United States Patent
Bari et al.

(10) Patent No.: US 12,679,230 B2
(45) Date of Patent: Jul. 14, 2026

(54) ENERGY MANAGEMENT AND CONTROL SYSTEM

(71) Applicant: ECOMAR PROPULSION LTD, Hampshire (GB)

(72) Inventors: Eugene Xavier Bari, Hampshire (GB); Malcolm Padwick, Hampshire (GB)

( * ) Notice: Subject to any disclaimer, the term of this patent is extended or adjusted under 35 U.S.C. 154(b) by 0 days.

(21) Appl. No.: 18/903,337

(22) Filed: Oct. 1, 2024

(65) Prior Publication Data

US 2025/0229651 A1 Jul. 17, 2025

Related U.S. Application Data

(63) Continuation of application No. PCT/IB2023/053357, filed on Apr. 3, 2023.

(30) Foreign Application Priority Data

Apr. 1, 2022 (GB) ..................................... 2204759

(51) Int. Cl.
*B60L 50/75* (2019.01)
*B60L 7/12* (2006.01)
(Continued)

(52) U.S. Cl.
CPC ................. *B60L 50/75* (2019.02); *B60L 7/12* (2013.01); *B60L 50/52* (2019.02); *B60L 58/18* (2019.02);
(Continued)

(58) Field of Classification Search
CPC .......... B60L 50/75; B60L 58/18; B60L 58/40; B60L 50/52; B60L 7/12; B60L 2200/32;
(Continued)

(56) References Cited

U.S. PATENT DOCUMENTS 6,793,027 B1 * 9/2004 Yamada ................ B60L 3/0046
180/65.1
7,442,452 B2 * 10/2008 Miura ............... H01M 8/04388
429/424
(Continued)

FOREIGN PATENT DOCUMENTS

CN 109591992 A * 4/2019 ............. B63H 21/21
CN 109649624 A * 4/2019 ............. B63H 21/20
(Continued)

OTHER PUBLICATIONS

Translation of JP 2001069614 A accessed on Jun. 11, 2025 at www.espacenet.com (Year: 2001).*
(Continued)

*Primary Examiner* — James A Shriver, II
*Assistant Examiner* — Hilary L Johns
(74) *Attorney, Agent, or Firm* — William H. Bollman

(57) ABSTRACT

An electric motor and energy management control system for use with at least one rechargeable battery and at least one hydrogen fuel cell in an electric powered marine vessel. A processor is configured to receive: a drive signal from a throttle unit in response to an operator command; a signal from a sensor connected a hydrogen fuel cell to provide a status. The processor is use transmits the output drive signal to a motor controller which is operative to supply a DC source to an electric motor of an electric powered marine vessel, to receive the output drive signal from the processor, and in response to the output drive signal to selectively switch between providing a DC supply from the rechargeable battery and/or a DC supply from the hydrogen fuel cell in order to optimize an available DC source to supply the electric motor.

14 Claims, 1 Drawing Sheet

(51) Int. Cl.
*B60L 50/52* (2019.01)
*B60L 58/18* (2019.01)
*B60L 58/40* (2019.01)

(52) U.S. Cl.
CPC ........... *B60L 58/40* (2019.02); *B60L 2200/32* (2013.01); *B60L 2240/425* (2013.01); *B60L 2240/545* (2013.01); *B60L 2240/622* (2013.01); *B60L 2240/66* (2013.01); *B60L 2250/10* (2013.01); *B60L 2250/16* (2013.01)

(58) Field of Classification Search
CPC ......... B60L 2240/425; B60L 2240/545; B60L 2240/622; B60L 2240/66; B60L 2250/10; B60L 2250/16
USPC ....................................................... 180/65.29
See application file for complete search history.

(56) References Cited

U.S. PATENT DOCUMENTS

| | | | | |
|---|---|---|---|---|
| 11,014,837 | B2 * | 5/2021 | Gwon | G01C 11/00 |
| 11,377,997 | B2 * | 7/2022 | Watanabe | F01P 3/205 |
| 2004/0065489 | A1 * | 4/2004 | Aberle | B60W 10/26 |
| | | | | 180/65.1 |
| 2006/0166060 | A1 * | 7/2006 | Miura | H01M 8/04664 |
| | | | | 429/513 |
| 2007/0138006 | A1 * | 6/2007 | Oakes | B60L 58/30 |
| | | | | 204/266 |
| 2010/0041285 | A1 * | 2/2010 | Riggs | B63B 35/00 |
| | | | | 440/6 |
| 2019/0367387 | A1 * | 12/2019 | Gwon | C25B 1/04 |
| 2020/0309015 | A1 * | 10/2020 | Watanabe | F01P 11/12 |
| 2021/0139124 | A1 * | 5/2021 | Culpi | B63H 20/32 |
| 2023/0234688 | A1 * | 7/2023 | Jaszewski | B63H 20/007 |
| | | | | 440/6 |

FOREIGN PATENT DOCUMENTS

| | | | | | |
|---|---|---|---|---|---|
| CN | 109878675 | A | * | 6/2019 | |
| CN | 112104062 | A | | 12/2020 | |
| CN | 212530035 | U | * | 2/2021 | |
| CN | 109591992 | B | | 3/2021 | |
| EP | 3922545 | A1 | | 12/2021 | |
| JP | 200169614 | | | 3/2001 | |
| JP | 2001069614 | A | * | 3/2001 | .............. B60L 58/33 |
| KR | 20200056089 | A | * | 5/2020 | ............ B63H 21/17 |
| KR | 1020200056089 | | | 5/2020 | |
| KR | 102323702 | | | 11/2021 | |
| KR | 102323702 | B1 | * | 11/2021 | ............... B63J 3/04 |

OTHER PUBLICATIONS

Translation of KR20200056089A obtained at www.espacenet.com on Jun. 11, 2025. (Year: 2020).*
Translation of KR-102323702-B1 accessed at www.espacenet.com on Jun. 12, 2025. (Year: 2021).*
"Patents Act 1977 Examination Report under Section 18(3) CONT" in GB2204759.1, dated Jan. 13, 2025.
"Patents Act 1977: Examination Report under Section 18(3)" in GB2204759.1, dated Jan. 13, 2025.
Amended Claims (clean), filed Jan. 13, 2025 in GB2204759.1.
Amended Claims (tracked), filed Jan. 13, 2025 in GB2204759.1.
Applicant amendment in GB2204759.1, dated Mar. 12, 2025.
"Patents Act 1977: Intention to Grant under Section 18(4)" in GB2204759.1, dated Mar. 31, 2025.
"Combined Search and Examination Report under Sections 17 and 18(3)" in GB2204759.1, dated May 31, 2022.
"Combined Search and Examination Report under Sections 17 & 18(3), p. 1/1" in GB2204759.1, dated May 31, 2022.
"Patents Act 1977: Search Report under Section 17" in GB2204759.1, dated May 30, 2022.
"PCT Notification of Transmittal of the International Search Report and the Written Opinion of the International Searching Authority, or the Declaration" in PCT/IB2023/053357, mailed May 31, 2023.

* cited by examiner

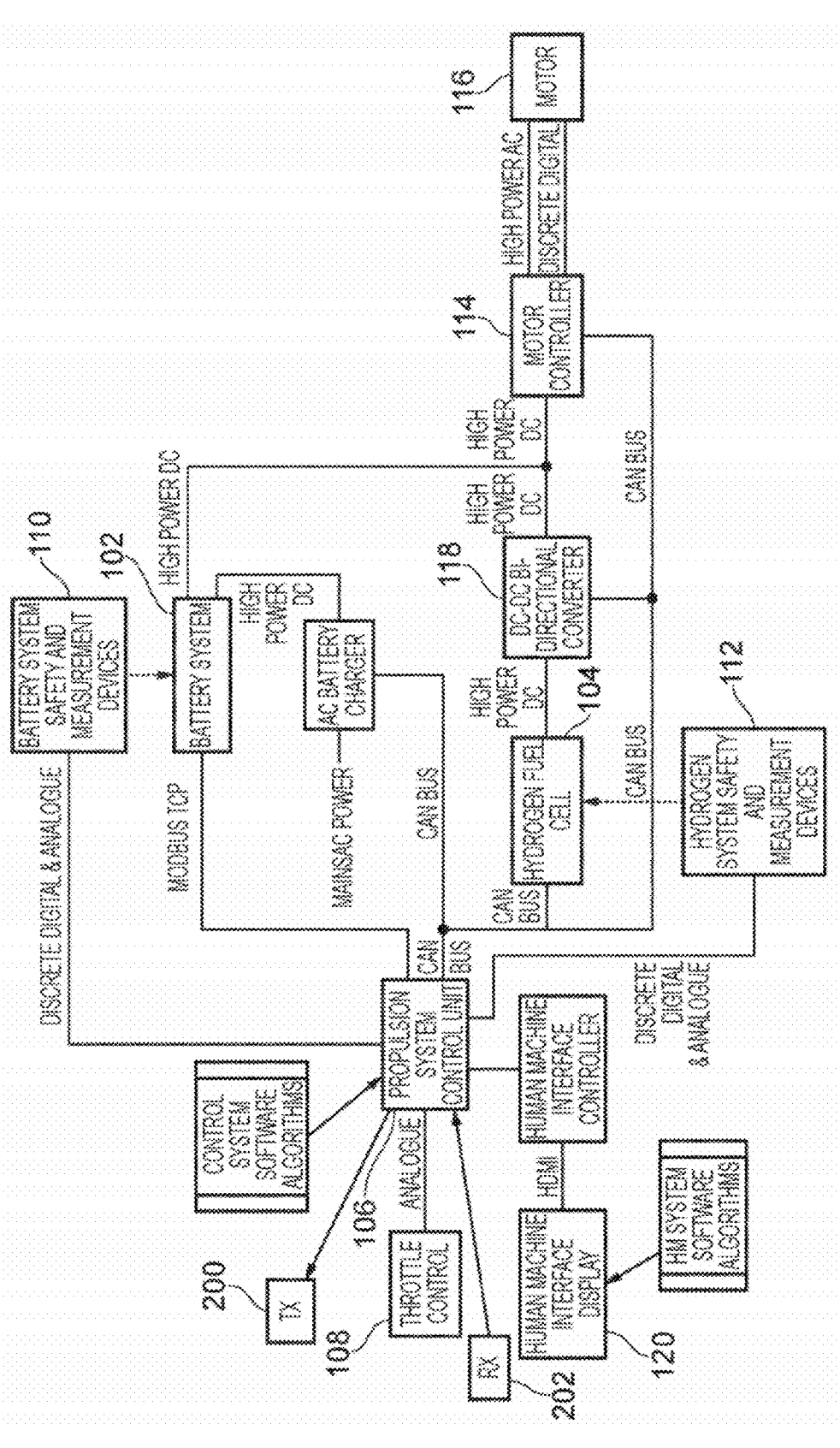

ENERGY MANAGEMENT AND CONTROL SYSTEM

FIELD

The present invention relates to an energy management and control system for use with an electric motor and electric powered marine vessel.

BACKGROUND OF INVENTION

Combustion engines powered by fossil fuels generate carbon dioxide which is considered to be responsible for accelerating climate change and rising global average temperatures. The concentration of carbon dioxide in the atmosphere has increased to over 400 parts per million. By way of comparison, in 1800, the concentration of carbon dioxide in the atmosphere was below 283 ppm.

Diesel (derv) was once considered to be a more environmentally friendly fuel source than petrol as it produces less carbon dioxide. However, diesel produces considerably more NOx including nitrous oxide which is typically around 300 times more powerful as a greenhouse gas than carbon dioxide. Diesel also produces nitrous dioxide which is a major pollutant and contributes to smog.

Governments are now starting to reduce or even ban the sale of fossil fuel vehicles in order to reduce health risks from pollutant particulates and to meet national greenhouse gas targets.

Marine vessels encounter unpredictable conditions (such as changing tides and wind directions) which can suddenly and unpredictably affect their energy requirements and usage. As vessel power systems increasingly transition from fossil fuel to being electrically powered, there is a need for electrically powered vessels to be capable of navigating to port or shore, for example in the event of unfavourable weather conditions.

There is therefore a need for a control system which is able to manage and control energy levels and to optimise energy usage in order to enable a vessel to safely and effectively manoeuvre and return to shore or port safely and avoid the risk of becoming stranded.

PRIOR ART

European patent application EP 3 922 545 (GMS Global Maritime Services ltd) discloses a system for producing hydrogen on-board a sea-borne vessel using energy from renewable resources. The sea-borne vessel comprises at least one renewable energy generator to generate electrical energy: at least one battery configured to store energy generated; an on-board hydrogen electrolysis generator and a hydrogen storage tank.

Korean patent application KR 102323702 (주식회사 파로스마린) discloses a method of operating a hydrogen-electric plug-in hybrid server for a ship comprising the steps of: driving a power control system with a battery and a hydrogen fuel cell which supply power to an electric motor. The battery may be charged from an external charging facility and the hydrogen fuel cell may include a hydrogen storage tank.

Korean patent application KR 20200056089 (Samsung Heavy Ind) discloses a hybrid ship which determines a navigation path based on a course and environmental variables and determines when to operate a fuel cell system and when to operate a battery system to propose an optimal course.

U.S. Pat. No. 6,793,027 (Yamaha Motor Co ltd) discloses a hybrid-driven device including an electric power storage device and a fuel cell. The hybrid-driven device may be a watercraft or an automobile. The electric power storage device may be a battery or a fuel cell. Each has a controller. Modules are removably mounted and can include sensors for detecting a state of the respective module. Each module also includes a memory for storing data gathered by the sensors. A controller controls a power storage device and the fuel cell to provide smooth operation of the device.

However, there is a need for an electric motor and energy management control system to be able to control power output from a fuel cell and/or battery that is dependent upon a level of drive signal from a throttle unit in response to an operator command in order to conserve available resources.

As throttle levels determine efficiency of power outputs, and particularly in combination with other factors such as windage and tidal flows, there is a need to optimise and sometimes conserve available fuel cell and battery resources.

SUMMARY OF INVENTION

According to a first aspect of the present invention, there is provided an electric motor and energy management control system for use with at least one rechargeable battery and at least one hydrogen fuel cell, in an electric powered marine vessel, including an electric motor, a processor and a motor controller which are operative to supply a direct current source to at least one electric motor, the motor controller is operative to selectively switch between providing a direct current (DC) supply from the at least one rechargeable battery and/or a direct current (DC) supply from the at least one hydrogen fuel cell dependent on:

a drive level signal received from a throttle unit in response to an operator command;

a first signal from a first sensor connected to at least one rechargeable battery to provide an indication of battery level status; and a second signal from a second sensor connected to at least one hydrogen fuel cell to provide an indication of hydrogen fuel cell status.

When operational, the electric motor and energy management control system is also able to optimise output power dependent upon operator demand, available resources, environmental factors and battery and fuel cell status. For example at high throttle values and thus high current levels, it may be preferred to use batteries rather than fuel cells (or vice versa) in dependence immediate local criteria and longer term voyage expectations.

The at least one electric motor is preferably a radial flux motor.

Because the motor controller receives the drive level signal received from a throttle unit it optimises an available energy source to supply the at least one electric motor. Thus for example if an operator demands a high drive level by applying a full throttle, the motor controller assesses available reserves from a battery status level signal and fuel cell status level signal and is operative to override a demanded power output. Therefore instead of applying a current commensurate with the demanded power output the motor controller supplies a prescribed supply of direct current to the at least one electric motor in order to conserve supply when limited. In this sense the electric motor and energy management control system effectively operate the electric powered marine vessel in a so-called 'limp' mode which may help to ensure a safe return to port.

The system preferably further comprises a charger connectable to an alternating current (AC) supply. The charger may be configured in use to charge the at least one rechargeable battery.

The processor may be configured to provide a command signal to the charger. The charger is preferably operative, in response to a command signal from the processor, to charge the at least one rechargeable battery.

The system may further comprise at least one pair of radial flux motors connectable or connected to an input shaft via a gearbox.

The processor is optionally configured to moderate power output by using a drive level signal from the throttle unit to modify and control the operation of the gearbox, including a gearbox ratio.

The at least one radial flux motor is preferably configured to receive a DC supply from the motor controller in response to a signal from the throttle unit.

The processor which in combination with other input data as described below and in accordance with control software, the output drive signal) is preferably configured to determine magnitude and instant of supplying DC to the, or each, radial flux motor.

The system may further comprise a regenerative brake. The regenerative brake is configured to convert kinetic energy from the at least one radial flux motor to an electric current. The regenerative brake is preferably operative to supply electric current it generates to the at least one hydrogen fuel cell and/or a at least one battery.

The system ideally includes a global positioning system (GPS) operative to receive a GPS signal indicative of a vessel location. The processor is operative to receive the GPS signal to determine a course to steer for the vessel.

The system preferably further comprises a wireless receiver operative to receive metrological data indicative of weather conditions at its location and at its intended destination. The metrological data is preferably supplied as a signal indicative of at least one maritime variable from the list including: air pressure, windspeed, wind direction.

Further relevant maritime data may be obtained, for example from satellites, and includes current data and/or tide data.

The electric motor and energy management control system preferably utilises the GPS data, the metrological data, the maritime data and the drive level signal from the throttle it optimises an available energy source and to predict a desired course to steer.

The system is preferably provided in an hermetically sealed unit which is ideally also shockproof.

The system preferably further comprises an alert device that is operable to receive a warning signal received from at least one safety sensor. The at least one safety sensor is operable to determine one or more of: a gas leak, low coolant, motor temperature and/or battery temperature, or any combination thereof. The alert mechanism is operable to generate an alert signal (which may be audible and/or visual) to notify users of a gas leak, low coolant, motor and/or battery temperatures exceeding predetermined maximum temperatures.

The system may further comprise a transmitter operable to transmit an alert signal to a remote recipient.

The system preferably comprises a battery supply back up. The battery supply back up is preferably operable to provide a direct current to the at least one electric motor of the electric powered marine vessel. The motor controller is preferably operative to supply a direct current source from the battery supply back up in response to the output drive signal received from the processor. The output drive signal may indicate that the battery level status and hydrogen fuel cell status are below a predetermined minimum level.

The system may comprise a plurality of rechargeable batteries connected together.

The system may comprise a plurality of hydrogen fuel cells connected together in series or parallel.

Optionally a battery supply back up is provided for navigational and/or radio communications equipment which is available for emergency use in order to operate communication and navigation equipment in the event of a complete power failure, for example in the event when fuel cells and batteries become depleted.

BRIEF DESCRIPTION OF THE FIGURE

FIG. 1 is a schematic illustration of an electric motor and energy management control system for a marine vessel according to one embodiment of the present invention.

DETAILED DESCRIPTION OF PREFERRED EMBODIMENT OF THE INVENTION

With reference to FIG. 1, the electric motor and energy management control system 100 for use in an electric powered marine vessel (not shown) comprises a rechargeable battery 102 and a hydrogen fuel cell 104. It is to be understood that the system may comprise any suitable number of rechargeable batteries 102 and hydrogen fuel cells 104.

The electric motor and energy management control system 100 further comprises a processor 106 configured in use to receive: a drive signal from a throttle unit 108 in response to an operator command; a first signal from a first sensor 110 connected to the rechargeable battery 102 to provide an indication of battery level status; and a second signal from a second sensor 112 connected to the hydrogen fuel cell 104 to provide an indication of hydrogen fuel cell status.

The processor 106 is operative to derive an output drive signal from the drive signal and from the first and second signals. The processor 106 is configured in use to transmit the output drive signal to a motor controller 114.

The motor controller 114 is operative to supply a direct current source to an electric motor 116 of the electric powered marine vessel. The electric motor is configured to receive a DC supply from the motor controller 114 in response to a signal, received by the processor 106, from the throttle unit 108. The electric motor is a radial flux motor; however it is to be understood that the electric motor may be any suitable type of motor.

It is to be understood that the vessel may comprise a plurality of electric motors 116 or preferably a plurality of pairs of electric motors connected so that motors of each (air run in the same sense—that is both clockwise or both anti-clockwise. For example, the vessel may comprise at least one pair of radial flux motors connected to an input shaft via a gearbox.

The motor controller 114 is operative to receive the output drive signal from the processor 106, and operative in response to the output drive signal to selectively switch between providing a direct current (DC) supply from the rechargeable battery 102 and/or a direct current (DC) supply from the hydrogen fuel cell 104 in order to optimise an available DC source to supply the electric motor 116.

The system 100 further comprises an AC battery charger 118 connectable to an alternating current (AC) supply. The charger 118 is configured in use to charge the at least one rechargeable battery 102. The processor 106 is configured to provide a command signal to the charger 118. The charger 118 is operative, in response to a command signal from the processor 106, to charge the rechargeable battery 102.

In use, the processor 106 receives a first signal from the first sensor 110 connected to the rechargeable battery to provide an indication of battery level status, together with a second signal from a second sensor 112 connected to the hydrogen fuel cell 104 to provide an indication of hydrogen fuel cell status.

Furthermore, the processor 106 receives a drive signal from the throttle unit 108 in response to an operator command. The processor 106 then produces an output drive signal (as a result of the received signals) which is transmitted to the motor controller 114 which is able to selectively switch between providing a DC current from the rechargeable battery 102 or from the hydrogen fuel cell 104 (or both) as a result of the drive signal. The processor 106 is able to determine the magnitude and instant of supplying DC to the motor. The system 100 is therefore able to optimise available DC sources to supply power to the electric motor 116 as a result of operator usage (throttle level) and energy levels remaining in the battery or hydrogen fuel cell.

The system provides a control system for optimising available supply of direct current from the most suitable energy source (battery or hydrogen fuel cell) as a direct result of energy levels as indicated by the first and second sensors 110, 112 and the operator usage as indicated by the drive signal from the throttle unit 108. The processor 106 may, when necessary, dependent on the first signal, emit a command signal to ensure that the charger supplies charge to the battery 102.

The system further comprises a wireless receiver operative to receive a signal indicative of at least one maritime variable from the list including: air pressure, windspeed, wind direction, current and/or tide, or any combination thereof.

The system further comprises an alert mechanism operable to receive a warning signal received from at least one safety sensor. The at least one safety sensor is operable to determine one or more of: a gas leak, low coolant, motor temperature and/or battery temperature, or any combination thereof. The alert mechanism is operable to generate an alert signal (which may be audible and/or visual) to notify users of a gas leak, low coolant, motor and/or battery temperatures exceeding predetermined maximum temperatures.

The system may further comprise a transmitter operable to transmit an alert signal to a remote recipient.

The system also comprises a global positioning system (GPS) operative to receive a GPS signal indicative of a vessel location. The processor 106 is operative to receive a GPS signal to determine a course to steer for the vessel.

The system may also comprise a user interface 120 enabling the user to set for example one or more of: predetermined minimum energy levels for the battery and/or fuel cell, set course of travel, speed settings, number of passengers etc.

The system is therefore able to calculate the amount of energy available within the batter and hydrogen fuel cell, and the most suitable supply of DC energy required in order to navigate the vessel on an identified course to safety, for example back to shore. The system is responsive to external conditions such as for example windspeed, wind direction, current and/or tide.

The system is operable to alter the supply of DC energy in response to these external conditions to optimise DC supply and to ensure safe and efficient transportation of the vessel. If necessary, the system may effect charging of the battery 102 to ensure that there is enough DC supply within the battery 102. The system may ensure that the DC supply is provided from the hydrogen fuel cell 104 whilst the battery 102 is being charged by the charger 118.

The system may also comprise a user interface 120 enabling the user to set for example one or more of: predetermined minimum energy levels for the battery and/or fuel cell, set course of travel, speed settings, number of passengers and expected weather and tide conditions.

The system is therefore able to calculate an expected amount of energy required and monitor actual available from the battery and/or hydrogen fuel cell. The system also selects the most suitable supply of DC energy in order to navigate the vessel on an identified course to safety, for example back to shore or port.

The system continually monitors and updates available battery resources and derives meteorological and tidal data of conditions, such as for example windspeed, wind direction, current and/or tide and updates expected energy requirements from this data.

In one embodiment the system processor monitors available energy resources and distance yet to be travelled, (either to a destination or a 'course to be steered' or a 'return to port') and checks that there is sufficient energy resources available in order to complete a voyage.

As a continual monitoring of resources is performed, and a continual monitoring of energy spent including throttle levels and instantaneous signals from the first sensor to provide an indication of battery level status; and the second sensor to provide an indication of hydrogen fuel cell status, an accurate live estimate is continually provided.

In some embodiments the system includes an alarm which is raised if, as a voyage progresses, the processor 106 indicates, based on estimates of energy required and actual resources levels measures, that there is a risk that the voyage may not be completed safely.

The system ideally also uses the aforementioned meteorological and tidal data and drive level data from the throttle unit to perform monitor actual power usage and available resources.

A safety factor may be included in calculations to account for steerage errors and thereby ensure that a sufficient reserve is available.

Likewise guidance information may be provided from the processor 106 to a pilot (captain) for example on a display or via an audio output to recommend that return voyages or new course is set to coincide with preferential tidal or other conditions in order to optimise a particular route or voyage time to benefit for example from advantageous tidal conditions, and so assist in a return to port.

The system is operable to alter the supply of DC energy in response to these external conditions to optimise DC supply and to ensure safe and efficient transportation of the vessel. If necessary, the system may affect charging of the battery 102 to ensure that there is enough DC supply within the battery 102. The system may ensure that the DC supply is provided from the hydrogen fuel cell 104 whilst the battery 102 is being charged by the charger 118.

The system can activate the alarm to notify an operator or a third party or an emergency service (such as the coastguard) that actions need to be taken, such as 'steer a different course' or 'return to shore', preferably along an identified course (as determined for example by the processor 106), in order to ensure that there are sufficient battery and/or fuel cell levels to do so, whilst taking into consideration factors such as wind and/or tides. The alarm may be transmitted automatically via a transmitter 200.

As a result, the system of the present invention minimises, or preferably eliminates, the risk of the vessel becoming stranded at sea as a result of lack of energy levels within the battery and/or hydrogen fuel cell as a result of the vessel using more energy due to sudden changes in tide and/or wind.

The invention has been described by way of examples only and it will be appreciated that variation may be made to the aforementioned embodiment without departing from the scope of protection as defined by the claims.

The invention claimed is:

1. An electric motor and energy management control system for use with at least one rechargeable battery and at least one hydrogen fuel cell, in an electric powered marine vessel, including at least one electric motor and a processor and a motor controller are operative to supply a direct current source to the at least one electric motor of the electric powered marine vessel and, in which the motor controller is operative to selectively switch between providing a direct current (DC) supply from the at least one rechargeable battery and/or a direct current (DC) supply from the at least one hydrogen fuel cell dependent on: a level of a drive signal received from a throttle unit in response to an operator command; a first signal from a first sensor connected to the at least one rechargeable battery to provide an indication of battery level status; a second signal from a second sensor connected to the at least one hydrogen fuel cell to provide an indication of hydrogen fuel cell status; and a global positioning system (GPS) that receives a GPS signal indicative of a location of the electric powered marine vessel, wherein the processor is operative to derive an output drive signal from the drive signal and from the first signal and the second signal and to calculate an amount of energy available and the processor processes the GPS signal, the first signal, the second signal and a signal indicative of at least one maritime variable from a list including: air pressure, windspeed, wind direction, current and/or tide, or any combination thereof, to determine an identified course and in order to ensure that there are sufficient energy levels within the at least one rechargeable battery and/or the at least one hydrogen fuel cell, selects a most suitable energy source from among the at least one rechargeable battery or the at least one hydrogen fuel cell required, and overrides the derived output drive signal with a reduced output drive signal, in order to navigate the electric powered marine vessel on the identified course.

2. The system according to claim 1 further including a battery charger which when connected to an alternating current (AC) supply, charges the at least one rechargeable battery in response to a command signal from the processor.

3. The system according to claim 1 wherein the at least one electric motor is a radial flux motor.

4. The system according to claim 3 wherein at least one pair of radial flux motors is connected to an input shaft via a gearbox.

5. The system according to claim 4 configured to determine a magnitude and instant of supplying DC to the, or each, of the at least one pair of radial flux motors.

6. The system according to claim 3 wherein a regenerative brake converts kinetic energy from the radial flux motor to an electric current which powers the at least one hydrogen fuel cell.

7. The system according to claim 1 further comprises an alert device when a warning signal is received from a safety sensor indicating at least one of a gas leak, a low coolant, a motor temperature, and a battery temperature.

8. The system according to claim 1 wherein a battery supply back-up is provided for navigational equipment.

9. The system according to claim 1 wherein a battery supply back-up is provided for radio communications equipment.

10. The system according to claim 1 wherein the at least one rechargeable battery comprises a plurality of rechargeable batteries connected together.

11. The system according to claim 1 wherein the at least one hydrogen fuel cell comprises a plurality of hydrogen fuel cells connected together.

12. The system according to claim 1 further includes a display.

13. The system according to claim 1 whereby the processor is further operative to determine available energy levels and energy spent to provide the indication of battery level status and to provide the indication of hydrogen fuel cell status.

14. The system according to claim 13 wherein an alert signal alarm device is configured to transmitted automatically via a transmitter to a remote recipient.

* * * * *